United States Patent
Donnell et al.

(10) Patent No.: US 11,861,778 B1
(45) Date of Patent: Jan. 2, 2024

(54) APPARATUS AND METHOD FOR GENERATING A VIRTUAL AVATAR

(71) Applicant: Gravystack, Inc., Phoenix, AZ (US)

(72) Inventors: Scott Donnell, Phoenix, AZ (US); Travis Adams, Phoenix, AZ (US); Chad Willardson, Phoenix, AZ (US)

(73) Assignee: Gravystack, Inc.

(*) Notice: Subject to any disclaimer, the term of this patent is extended or adjusted under 35 U.S.C. 154(b) by 0 days.

(21) Appl. No.: 17/872,135

(22) Filed: Jul. 25, 2022

(51) Int. Cl.
| | |
|---|---|
| *G06T 13/40* | (2011.01) |
| *G06T 19/20* | (2011.01) |
| *G06N 20/00* | (2019.01) |
| *G06F 40/10* | (2020.01) |
| *H04L 51/02* | (2022.01) |
| *G06T 19/00* | (2011.01) |

(52) U.S. Cl.
CPC ............ *G06T 13/40* (2013.01); *G06F 40/10* (2020.01); *G06N 20/00* (2019.01); *G06T 19/006* (2013.01); *G06T 19/20* (2013.01); *H04L 51/02* (2013.01)

(58) Field of Classification Search
None
See application file for complete search history.

(56) References Cited

U.S. PATENT DOCUMENTS

| | | | | |
|---|---|---|---|---|
| 6,522,333 B1* | 2/2003 | Hatlelid | .............. | H04M 1/2478 345/473 |
| 7,574,332 B2* | 8/2009 | Ballin | .............. | G06F 3/011 703/2 |
| 10,702,773 B2 | 7/2020 | Davis | | |
| 10,930,044 B2 | 2/2021 | Zelenin | | |
| 11,276,216 B2* | 3/2022 | Borovikov | .............. | G06N 3/045 |
| 11,295,503 B1* | 4/2022 | Orme | .............. | G06T 11/00 |
| 11,442,532 B2* | 9/2022 | Stafford | .............. | G06T 19/006 |
| 2002/0135581 A1* | 9/2002 | Russell | .............. | G06T 13/40 345/474 |
| 2006/0224546 A1* | 10/2006 | Ballin | .............. | G06T 17/00 706/62 |
| 2009/0216691 A1* | 8/2009 | Borzestowski | .............. | G06F 16/3332 715/706 |
| 2018/0342095 A1 | 11/2018 | Walsh | | |

(Continued)

FOREIGN PATENT DOCUMENTS

CN 113822973 A 12/2021

OTHER PUBLICATIONS

K. Aikawa, "Speech recognition using time-warping neural networks," Neural Networks for Signal Processing Proceedings of the 1991 IEEE Workshop, Princeton, NJ, USA, 1991, pp. 337-346, doi: 10.1109/NNSP.1991.239508. (Year: 1991).*

*Primary Examiner* — Ryan M Gray
(74) *Attorney, Agent, or Firm* — Caldwell Intellectual Property Law

(57) ABSTRACT

In an aspect, an apparatus for generating a virtual avatar is presented. An apparatus includes at least a processor and a memory communicatively connected to the at least a processor. At least a processor is configured to generate a virtual avatar model. A virtual avatar model includes a virtual entity and an operational model of the virtual entity. At least a processor is configured to receive user input. User input includes an avatar modifier. At least a processor is configured to modify at least a portion of a virtual avatar model as a function of an avatar modifier. At least a processor is configured to display a virtual avatar model to a user through a display device.

20 Claims, 5 Drawing Sheets

(56) References Cited

U.S. PATENT DOCUMENTS

| | | | |
|---|---|---|---|
| 2019/0060766 A1 | 2/2019 | Perry | |
| 2019/0340419 A1* | 11/2019 | Milman | G06T 13/40 |
| 2019/0392823 A1* | 12/2019 | Li | G10L 15/063 |
| 2020/0088463 A1* | 3/2020 | Jeong | G06F 3/011 |
| 2020/0306640 A1* | 10/2020 | Kolen | A63F 13/40 |
| 2021/0192824 A1* | 6/2021 | Chen | H04L 51/02 |
| 2021/0211487 A1* | 7/2021 | Lee | H04L 67/06 |
| 2021/0248801 A1* | 8/2021 | Li | G06T 17/20 |
| 2022/0253126 A1* | 8/2022 | Holland | G06F 3/011 |
| 2022/0277530 A1* | 9/2022 | Lu | G06T 19/006 |

\* cited by examiner

APPARATUS AND METHOD FOR GENERATING A VIRTUAL AVATAR

FIELD OF THE INVENTION

The present invention generally relates to the field of virtual avatars. In particular, the present invention is directed to an apparatus and method for generating a virtual avatar.

BACKGROUND

Modern virtual avatars have limited customization abilities. As such, modern virtual avatar generation can be improved.

SUMMARY OF THE DISCLOSURE

In an aspect, an apparatus for generating a virtual avatar is presented. An apparatus includes at least a processor and a memory communicatively connected to the at least a processor. At least a processor is configured to generate a virtual avatar model. A virtual avatar model includes a virtual entity and an operational model of the virtual entity. At least a processor is configured to receive user input. User input includes an avatar modifier. At least a processor is configured to modify at least a portion of a virtual avatar model as a function of an avatar modifier. At least a processor is configured to display a virtual avatar model to a user through a display device.

In another aspect, a method of generating a virtual avatar is presented. The method includes generating a virtual avatar model. The virtual avatar model includes a virtual entity and an operational model of the virtual entity. The method includes receiving user input. The method includes modifying at least a portion of a virtual avatar model as a function of user input. The method includes displaying a virtual avatar model to a user through a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating virtual avatars. In an embodiment, generating virtual avatars may include generating a virtual avatar model.

Aspects of the present disclosure can be used to modify virtual avatars. Aspects of the present disclosure can also be used to generate virtual avatar models from one or more images. This is so, at least in part, because an apparatus may generate virtual avatar models from image data using a machine vision process.

Aspects of the present disclosure allow for modifying virtual avatars as a function of user input. Exemplary embodiments illustrating aspects of the present disclosure are described below in the context of several specific examples.

Figure 1:
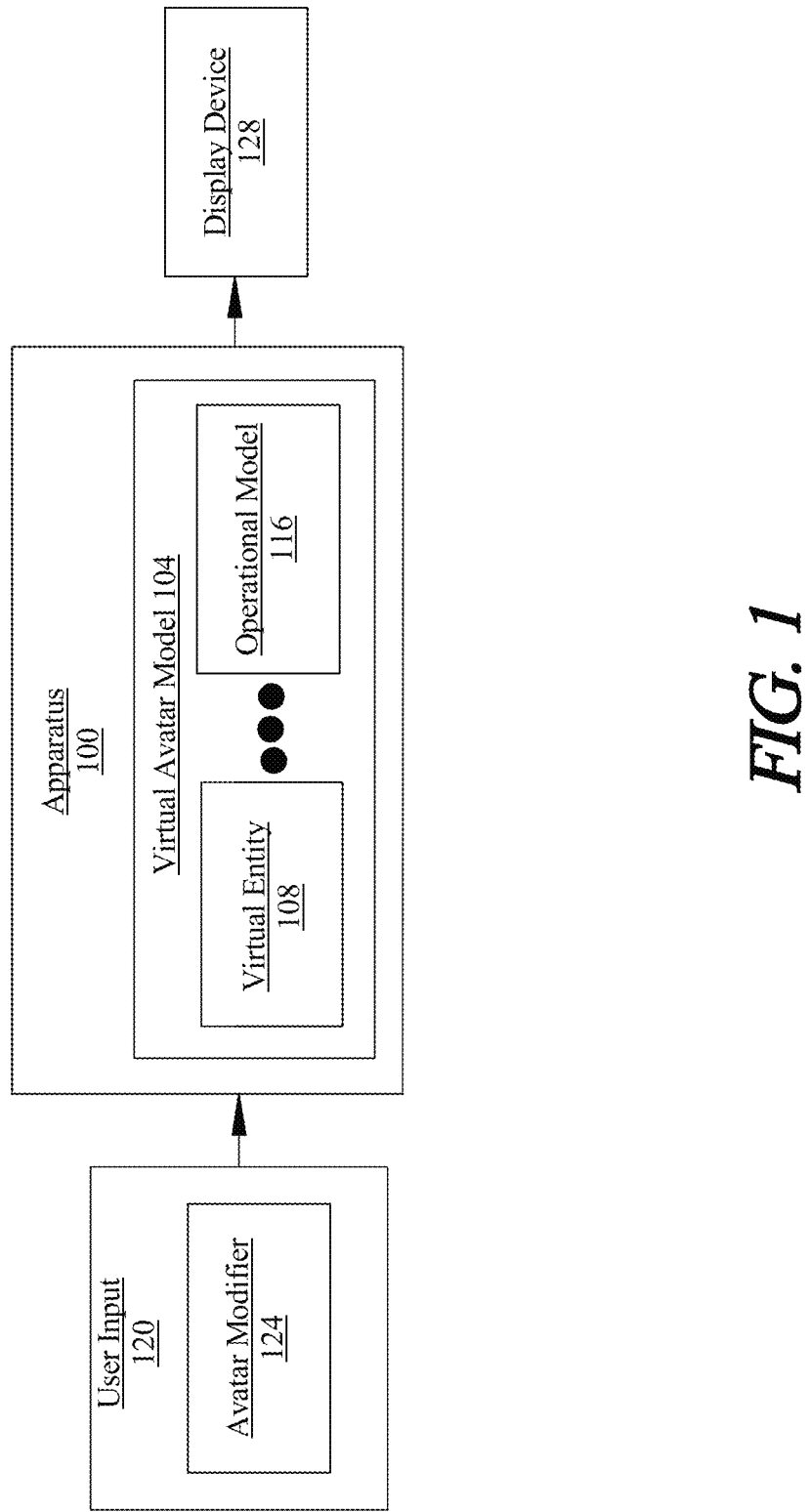
FIG. 1 is an exemplary embodiment of a block diagram of an apparatus for generating a virtual avatar.

Referring now to FIG. 1, an exemplary embodiment of an apparatus 100 for generating a virtual avatar is presented. Apparatus 100 may include at least a processor and a memory communicatively connected to the at least a processor. A memory may contain instructions configuring the at least a processor to perform various tasks. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a computing device. A computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of system 100 and/or computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may be configured to generate virtual avatar model 104. A "virtual avatar model" as used in this disclosure is a computer process that simulates one or more digital characters. Apparatus 100 may generate virtual avatar model 104 through one or more modeling software's, such as, but not limited to, Sketchup, Blender, ZBrush, AutoCAD, SolidWorks, 3Ds Max, Maya, Rhino3d, CATIA, and the like. In some embodiments, virtual avatar model 104 may include one or more formats, such as, but not limited to, "dwg", "dxf", "3ds", "dae", "dem", "def", "ifc", "kmz", "stl", "3dxml", "3dm", "3ds", "cd", "vda", "vrml", and the like.

Still referring to FIG. 1, virtual avatar model 104 may include one or more parameters for generating virtual entity 108. In some embodiments, parameters of virtual avatar model 104 may include, but are not limited to, avatar body type, avatar dimensions, avatar physics, and the like. An "avatar body type" as used in this disclosure is a category of a base model of a character. An avatar body type may include, but is not limited to, human, animal, robot, ethereal, amorphous, and the like. In some embodiments, an avatar body type may include a combination of two or more avatar body types, without limitation. As a non-limiting example, avatar body type may include robot animal. "Avatar dimensions" as used in this disclosure are digital character measurements. Avatar dimensions may include, but are not limited to, height, width, length, volume, and the like. In some embodiments, avatar dimensions may include one or more geometries of one or more parts of virtual entity 108. Geometries may include surface areas, angles, diameters, radii, points, concavity, convexity, and the like. Avatar dimensions of virtual avatar model 104 may include one or more geometries of limbs, appendages, facial features, clothing, hair, fur, and/or other aspects of virtual entity 108. For instance and without limitation, virtual avatar model 104 may include geometries of a hand structure of virtual entity 108, such as finger length, finger circumference, palm shape, and the like. In some embodiments, avatar dimensions of virtual avatar model 104 may be represented as one or more polygons, such as, but not limited to, triangles, squares, hexagons, and the like. Virtual avatar model 104 may utilize one or more rendering techniques to generate virtual entity 108, such as, but not limited to, shading, texturing, and the like. In some embodiments, virtual avatar model 104 may generate virtual entity 108 through mesh shading such as, but not limited to, flat-shading, smooth-shading, and the like. Avatar dimensions of virtual avatar model 104 may include one or more sets of coordinates for one or more parts of virtual entity 108 in a coordinate system. A "coordinate system" as used in this disclosure is a system that uses one or more numbers to determine position of one or more points. A coordinate system may include, without limitation, cartesian, polar, and the like. In some embodiments, a coordinate system may represent a real world plane in a digital reality. Generating a coordinate system in a digital reality representing a real world plane may include a machine vision process as described below. In some embodiments, parameters of virtual avatar model 104 may include relative sizes of one or more parts of virtual entity 108. A "relative size" as used in this disclosure is an apparent stature of an object and/or entity from a perspective view. A relative size of virtual entity 108 and/or other virtual objects may be calculated by apparatus 100. Apparatus 100 may use a machine learning model, machine vision process, and/or other processing model described throughout this disclosure, without limitation, to generate a relative size of virtual entity 108. In some embodiments, a relative size of virtual entity 108 may be updated as a function of user input 120.

Still referring to FIG. 1, a "virtual entity" as used in this disclosure is a digital representation of a character. A character may include, but is not limited to, animals, humans, robots, inanimate objects, and/or any combination thereof, without limitation. For instance, and without limitation, virtual entity 108 may include a digital representation of a penguin character. Virtual entity 108 may include, but is not limited to, two-dimensional characters, three-dimensional characters, and the like. Apparatus 100 may generate virtual entity 108 in an augmented reality (AR) space, virtual reality (VR), space, and/or any other digital realities.

Still referring to FIG. 1, in some embodiments, virtual avatar model 104 may include operational model 116. An "operational model" as used in this disclosure is a computer process that dictates animations and/or interactions of one or more virtual entities. Operational model 116 may be programmed to configure virtual entity 108 to perform one or more tasks, movements, conversations, and the like. In some embodiments, operational model 116 may comprise behavioral parameters corresponding to animations of virtual entity 108. "Behavioral parameters" as used in this disclosure are metrics associated with interactions of a virtual entity. Behavioral parameters may include, but are not limited to, facial animations, responsiveness, interaction with an environment, and the like. Facial animations may include, but are not limited to, grinding teeth, smirking, crying, laughing, clenching, grinding teeth, showing surprise, and the like. In some embodiments, behavioral parameters may be tuned as a function of an avatar body of virtual entity 108. For instance and without limitation, virtual entity 108 may include a shark character, which may have corresponding behavioral parameters of a more serious demeanor. Virtual entity 108 may include a monkey character, which may have corresponding behavioral parameters of a lighthearted, energized demeanor. In other embodiments, behavioral parameters may be consistent throughout multiple varying avatar models. In some embodiments, facial animations of behavioral parameters may be tuned to an avatar body. For instance and without limitation, virtual entity 108 may include a shark character. A facial animation of a grin for a shark character may include an overextended, dramatic teeth-bearing smile whereas a facial animation of a grin for a bee may include a closed mouth smile.

Still referring to FIG. 1, operational model 116 may include one or more animations and/or triggers of animations of virtual entity 108. Animations may include, but are not limited to, walking, running, jumping, hiding, celebrating, nodding, and the like. Triggers of animations may include, but are not limited to, geographical positions, user input, engagement with virtual objects, and the like. For instance and without limitation, operational model 116 may include an animation of jumping for joy, which may have a trigger including a proximity of a user to virtual entity 108. Animations and triggers of animations of operational model 116 may be based on avatar models, user profiles, and/or other factors. In some embodiments, apparatus 100 may include a behavioral machine learning model. In some embodiments, operational model 116 may include the behavioral machine learning model. A behavioral machine learning model may be trained with training data correlating user data to behavioral parameters. In some embodiments, the processor may be configured to train the behavioral machine learning model. Training data may be received through user input, external computing devices, and/or through previous iterations of processing. In some embodiments, training data may be received from a database, such as a training data database. In some embodiments, the behavioral machine learning model may be configured receive user data as input and output one or more behavioral parameters. Operational model 116 may use the behavioral machine learning model to determine behavioral parameters of virtual entity 108 based on user input 120. "User input" as used throughout this disclosure is information received from an individual. User input 120 may include, but is not limited to, text entries, voice input, images, videos, and the like. In some embodiments, apparatus 100 may receive user input 120 from one or more computing devices and/or software, such as, but not limited to, cloud-computing networks, web applications, mobile applications, and the like. For instance and without limitation, apparatus 100 may receive photographic images through a web camera of a laptop that may be connected to apparatus 100 through a wireless and/or wired connection. In other embodiments, apparatus 100 may receive user input 120 directly, such as through, but not limited to, keyboards, mouse input, camera input, microphone input, and the like.

Still referring to FIG. 1, in some embodiments, apparatus 100 may utilize the behavioral machine learning model to mimic and/or replicate a user's emotions and/or behavioral patterns. Virtual entity 108 may appear to "learn" certain behaviors and/or patterns. User input 120 may include user data showing a user is highly engaged, happy, and energetic. Apparatus 100 may determine, using a behavioral machine learning model, that one or more behavioral parameters of operational model 112 should include high engagement and/or happy behaviors. In other embodiments, apparatus 100 may determine one or more behavioral parameters to be different than that of one or more behaviors of user input 120. For instance and without limitation, a user may exhibit signs of solemness. Apparatus 100 may determine, in some embodiments, through the behavioral machine learning model, that one or more behavioral parameters of operational model 112 should include happy behavioral patterns. Apparatus 100 may compare user behaviors and/or patterns of user input 120 to a behavioral threshold. A "behavioral threshold" as used in this disclosure is a value or values constraining a triggering of a change of one or more behavioral parameters. A behavioral threshold may include, but is not limited to, one or more numbers, percentages, and the like, which may correspond to one or more behaviors. Apparatus 100 may compare behaviors of user input 120 to a behavioral threshold corresponding to happiness. If behaviors of user input 120 meet a behavioral threshold of happiness, operational model 112 may adjust one or more behavioral parameters of virtual entity 108 to increase an engagement of virtual entity 108 with a user, without limitation.

In some embodiments, animation may be generated using stored rules for representation and/or modification of static images. Stored rules may include, without limitation, rules associating an event as detected by sensing devices with an image and/or sound representing a reaction thereto by an animated character. For instance, a given event and/or input may be associated with an endpoint image, such as a "surprising" event with an image of an avatar with a surprised expression. Similar associations may be made between expressions and/or poses indicating simulated reactions to pleasing events, exciting events, annoying events, humorous events. Animated sequences may be stored transitioning from a first pose representing a first simulated emotional state and/or response and a second pose representing a second simulated emotional state and/or response. Alternatively or additionally, stored rules may indicate modifications to images and/or for creation of transitional images that can be used to generate an animated sequence of images from one simulated emotional state and/or response. Emotional states and/or responses may be regulated, without limitation, using a finite state machine directing transition from one emotional state and/or response to another.

Still referring to FIG. 1, stored rules, modified images, and/or modifications to images may be entered and/or defined manually; alternatively or additionally, modified images, and/or modifications to images may be generated using a machine-learning process that may be trained using manually generated images, modifications thereto, and/or sequences of such images and/or modifications, and/or manually identified examples of such training examples in existing animated and/or live-action stills and/or sequences. Machine-learning models may include models trained to recognize features in a picture of a character, models trained to modify identified features and/or entire images, models trained to identify and/or generate transitional images traversing from one static image to another static image in a sequence, or the like. Static images and/or modifications may be associated with responses to particular inputs by additional models.

Still referring to FIG. 1, in some embodiments, apparatus 100 may generate a chatbot. A "chatbot" as used in this disclosure is a program that communicates semantic information between an individual and a computing device. A chatbot may be communicative with apparatus 100. Apparatus 100 may be configured to operate a chatbot. In some cases, a chatbot may be local to apparatus 100. Alternatively or additionally, in some cases, a chatbot may be remote to apparatus 100 and communicative with apparatus 100, by way of one or more networks, such as without limitation the internet. Alternatively or additionally, a chatbot may communicate with apparatus 100 using telephonic devices and networks, such as without limitation fax machines, short message service (SMS), or multimedia message service (MMS). In some embodiments, a chatbot may communicate with apparatus 100 using text-based communication, for example without limitation using a character encoding protocol, such as American Standard for Information Interchange (ASCII). Apparatus 100 may interface with a chatbot, by way of at least a submission from a user, such as through the chatbot, and a response from the chatbot. In many cases, one or both of submissions and responses may be text-based communication. Alternatively or additionally, in some cases, one or both of submissions and responses may be audio-based communication.

Continuing in reference to FIG. 1, a submission once received by apparatus 100 operating a chatbot, may be processed by apparatus 100. In some embodiments, apparatus 100 may processes a submission using one or more of keyword recognition, pattern matching, and natural language processing, machine learning models, and the like. In some embodiments, apparatus 100 may employ real-time learning with evolutionary algorithms. In some cases, apparatus 100 may retrieve a pre-prepared response from a storage component, based upon a submission. Alternatively or additionally, in some embodiments, apparatus 100 may communicate a response without first receiving a submission, which may initiate a conversation. In some cases, apparatus 100 may communicate an inquiry to a chatbot. Apparatus 100 may be configured to process an answer to the inquiry in a following submission from a chatbot. In some cases, an answer to an inquiry present within a submission from a user through a chatbot may be used by apparatus 100 as an input to another function, for example without limitation a feature or a preference input.

Still referring to FIG. 1, in some embodiments, apparatus 100 may determine user data of user input 120. "User data" as used throughout this disclosure is information pertaining to an individual. User data may include, but is not limited to, engagement data, preferences, biographical data, locational data, and the like. In some embodiments, apparatus 100 may determine user data of user input 120, such as a textual entry, using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or apparatus 100 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into apparatus 100. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, in some embodiments, apparatus 100 may utilize an automatic speech recognition model. An automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by apparatus 100. Apparatus 100 may then train an automatic speech recognition model according to training data which includes audible verbal content correlated to known content. In this way, apparatus 100 may analyze a person's specific voice and train an automatic speech recognition model to the person's speech, resulting in increased accuracy. Alternatively or additionally, in some cases, apparatus 100 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, apparatus 100 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include a subject. For example, a subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMIs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMIs) may include statistical models that output a sequence of symbols or quantities. HMIs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMIs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMI for a sequence of words or phonemes may be made by concatenating an HMIs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMI states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and an linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMIs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition. Apparatus 100 may utilize an automatic speech recognition process to determine one or more voice inputs of user data 116. For instance and without limitation, a user may say the phrase "show me a purple penguin!" to which apparatus 100 may utilize an automatic speech recognition process and generate virtual avatar model 104 to include a purple penguin.

Still referring to FIG. 1, in some embodiments, user input 120 may include avatar modifier 124. An "avatar modifier" as used in this disclosure is data representing digital character attributes. Avatar modifier 124 may include digital character attributes, such as attributes of virtual entity 108, which may include, without limitation, clothing, avatar body models, hair colors, skin colors, appendages, eye colors, voices, behaviors, and the like. Avatar modifier 124 may be received at apparatus 100 through a graphical user interface (GUI). A GUI may include a two-dimensional GUI that may be displayed on a monitor, laptop, and/or other screen. A GUI may include a three-dimensional GUI that may be displayed within a virtual reality, augmented reality, and the like. A GUI may include one or more sliders, buttons, drop-down menus, tables, and the like, which may be responsive to user input 120. For instance and without limitation, user input 120 may include a selection of a box of a GUI, where the box includes a representation of a giraffe avatar body model. Avatar modifier 124 may include a giraffe avatar body model. Apparatus 100 may modify at least a portion of virtual avatar model 104 as a function of user input 120 and/or avatar modifier 124. As a non-limiting example, apparatus may modify the height of virtual avatar model 104 as a function of user input 120 and/or avatar modifier 124. Apparatus 100 may display virtual entity 108 and/or virtual avatar model 104 through display device 128. A "display device" as used in this disclosure is a device having a screen. Display device 128 may include, but is not limited to, VR headsets, monitors, smartphones, laptops, mixed-reality headsets, smart glasses, and the like. In some embodiments, apparatus 100 may be connected to display device 128 through a wired and/or wireless connection. In some embodiments, apparatus 100 may be connected to display device 128 locally. In other embodiments, apparatus 100 may communicate virtual avatar model 104 to display device 128 through one or more computing devices, networks, and the like.

Still referring to FIG. 1, in some embodiments, apparatus 100 may generate virtual avatar model 104 through one or more images of user input 120. Apparatus 100 may be in communication with and/or may include one or more cameras. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

Still referring to FIG. 1, in some embodiments, apparatus 100 may include a machine vision system that includes at a camera. A machine vision system may use images from at least a camera 124, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, an exemplary range-imaging camera that may be included is Intel® RealSense™D430 Module, from Intel® of Mountainview, California, U.S.A. D430 Module comprises active infrared (IR) illumination and a stereoscopic camera, having global shutters and frame rate of up to 90 fps. D430 Module provide a field of view (FOV) of 85.2° (horizontal) by 58° (vertical) and an image resolution of 1280×720. Range-sensing camera may be operated independently by dedicated hardware or, in some cases, range-sensing camera may be operated by a computing device. In some cases, range-sensing camera may include software and firmware resources (for execution on hardware, such as without limitation dedicated hardware or a computing device). D430 Module may be operating using software resources including Intel® RealSense™ SDK 2.0, which include opensource cross platform libraries.

Still referring to FIG. 1, an exemplary machine vision camera may include an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

Still referring to FIG. 1, apparatus 100 may be in communication with and/or may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera is TaraXL from e-con Systems, Inc of San Jose, California. TaraXL is a USB 3.0 stereo-camera which is optimized for NVIDIA® Jetson AGX Xavier™/Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm.

With continued reference to FIG. 1, apparatus 100 may include at least an eye sensor. As used in this disclosure, an "eye sensor" is any system or device that is configured or adapted to detect an eye parameter as a function of an eye phenomenon. In some cases, at least an eye sensor may be configured to detect at least an eye parameter as a function of at least an eye phenomenon. As used in this disclosure, an "eye parameter" is an element of information associated with an eye. Exemplary non-limiting eye parameters may include blink rate, eye-tracking parameters, pupil location, gaze directions, pupil dilation, and the like. Exemplary eye parameters are described in greater detail below. In some cases, an eye parameter may be transmitted or represented by an eye signal. An eye signal may include any signal described in this disclosure. As used in this disclosure, an "eye phenomenon" may include any observable phenomenon associated with an eye, including without limitation focusing, blinking, eye-movement, and the like. In some embodiments, at least an eye sensor may include an electromyography sensor. Electromyography sensor may be configured to detect at least an eye parameter as a function of at least an eye phenomenon.

Still referring to FIG. 1, in some embodiments, an eye sensor may include an optical eye sensor. Optical eye sensor may be configured to detect at least an eye parameter as a function of at least an eye phenomenon. In some cases, an optical eye sensor may include a camera directed toward one or both of person's eyes. In some cases, optical eye sensor may include a light source, likewise directed to person's eyes. Light source may have a non-visible wavelength, for instance infrared or near-infrared. In some cases, a wavelength may be selected which reflects at an eye's pupil (e.g., infrared). Light that selectively reflects at an eye's pupil may be detected, for instance by camera. Images of eyes may be captured by camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object (e.g., person or person's eyes). In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image 116. An image 116 may be digital, such as without limitation when represented as a bitmap. Alternatively, an image may be comprised of any media capable of representing a physical scene, space, and/or object 108. Alternatively where "image" is used as a verb, in this disclosure, it refers to generation and/or formation of an image.

Still referring to FIG. 1, an exemplary camera is an OpenMV Cam H7 from OpenMV, LLC of Atlanta, Georgia, U.S.A. OpenMV Cam includes a small, low power, microcontroller 104 which allows execution of processes. OpenMV Cam comprises an ARM Cortex M7 processor 104 and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, for example by way of optical flow detection; detect and decode barcodes; capture images; and record video.

Still referring to FIG. 1, in some cases, a camera may be used to determine eye patterns (e.g., track eye movements). For instance, a camera may capture images and a processor (internal or external) to camera may process images to track eye movements. In some embodiments, a video-based eye tracker may use corneal reflection (e.g., first Purkinje image) and a center of pupil as features to track over time. A more sensitive type of eye-tracker, a dual-Purkinje eye tracker, may use reflections from a front of cornea (i.e., first Purkinje image) and back of lens (i.e., fourth Purkinje image) as features to track. A still more sensitive method of tracking may include use of image features from inside eye, such as retinal blood vessels, and follow these features as the eye rotates. In some cases, optical methods, particularly those based on video recording, may be used for gaze-tracking and may be non-invasive and inexpensive. For instance, in some cases a relative position between a camera and a person may be known or estimable. Pupil location may be determined through analysis of images (either visible or infrared images). In some cases, a camera may focus on one or both eyes and record eye movement as a viewer looks. In some cases, an eye-tracker may use center of pupil and infrared/near-infrared non-collimated light to create corneal reflections (CR). A vector between pupil center and corneal reflections can be used to compute a point of regard on surface (i.e., a gaze direction). In some cases, a simple calibration procedure with an individual person may be needed before using an optical eye tracker. In some cases, two general types of infrared/near-infrared (also known as active light) eye-tracking techniques can be used: bright-pupil (light reflected by pupil) and dark-pupil (light not reflected by pupil). Difference between bright-pupil and dark pupil images may be based on a location of illumination source with respect to optics. For instance, if illumination is coaxial with optical path, then eye may act as a retroreflector as the light reflects off retina creating a bright pupil effect similar to red eye. If illumination source is offset from optical path, then pupil may appear dark because reflection from retina is directed away from camera. In some cases, bright-pupil tracking creates greater iris/pupil contrast, allowing more robust eye-tracking with all iris pigmentation, and greatly reduces interference caused by eyelashes and other obscuring features. In some cases, bright-pupil tracking may also allow tracking in lighting conditions ranging from total darkness to very bright.

Still referring to FIG. 1, alternatively, in some cases, a passive light optical eye tracking method may be employed. Passive light optical eye tracking may use visible light to illuminate. In some cases, passive light optical tracking yields less contrast of pupil than with active light methods; therefore, in some cases, a center of iris may be used for calculating a gaze vector. In some cases, a center of iris determination requires detection of a boundary of iris and sclera (e.g., limbus tracking). In some case, eyelid obstruction of iris and our sclera may challenge calculations of an iris center.

Still referring to FIG. 1, some optical eye tracking systems may be head-mounted, some may require the head to be stable, and some may function remotely and automatically track the head during motion. Optical eye tracking systems 112 may capture images 116 at frame rate. Exemplary frame rates include 15, 30, 60, 120, 240, 350, 1000, and 1250 Hz. In some embodiments, apparatus 100 may utilize an eye tracking method to determine which parts of virtual entity 108 a user may be looking at. Apparatus 100 may update virtual avatar model 104 as a function of an eye tracking method. For instance and without limitation, apparatus 100 may determine a user is looking at a hat of virtual entity 108 and generate one or more alternative hat choices for a user to select for virtual entity 108.

Still referring to FIG. 1, apparatus 100 may use a machine vision process to generate virtual entity 108. In some embodiments, user input 120 may include one or more images and/or videos. Images and/or videos may be captured through, but not limited to, smartphone cameras, web cameras, and/or other camera systems. In some embodiments, images and/or videos may include, but are not limited to, selfies, photos of entities, photos of inanimate objects, and the like. Apparatus 100 may generate virtual entity 108 from image data of user 116. For instance and without limitation, user input 120 may include a photo of a banana. Apparatus 100 may generate virtual avatar model 104 to include an avatar body model of a banana. In some embodiments, user input 120 may include a selfie. Apparatus 100 may generate virtual avatar model 104 to represent a likeness of a selfie of a user.

Still referring to FIG. 1, user input 120 may include one or more task commands. A "task command" as used in this disclosure is an order for a digital character to perform an action. Task commands may include, but are not limited to, reminders, notifications, and the like. Apparatus 100 may utilize a task machine learning model to determine one or more task commands. A task machine learning model may be trained with training data correlating user data to one or more task commands. Training data may be received through user input, external computing devices, and/or previous iterations of processing. A task machine learning model may input user input and output one or more task commands. In some embodiments, a user may enter one or more task commands for virtual entity 108 to perform through apparatus 100. In other embodiments, apparatus 100 may determine one or more task commands as a function of historical data of a user, such as timing of tasks, types of tasks, importance of tasks, and the like.

Figure 2:
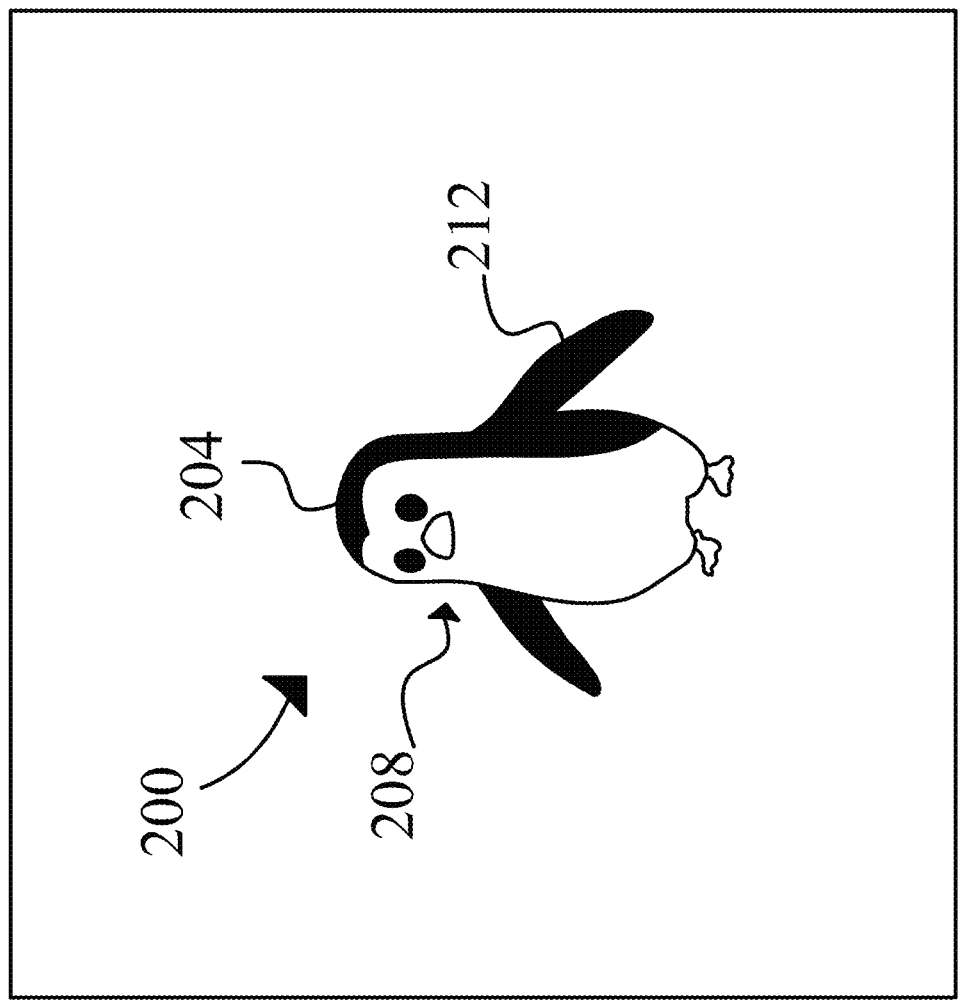
FIG. 2 is an exemplary embodiment of a virtual avatar.

Referring now to FIG. 2, an exemplary embodiment of virtual entity 200 is illustrated. Virtual entity 200 may be consistent with virtual entity 108 as described above with reference to FIG. 1. In some embodiments, virtual entity 200 may include body model 204. Body model 204 may include a base model for virtual entity 200 to be generated from. Body model 204 may include, but is not limited to, animals, humans, robots, inanimate objects, and the like. For instance and without limitation, virtual entity 200 may include a penguin model. A user may select one or more body models 204 from a plurality of body models 204. Selection may include, but is not limited to, clicking on one or more icons of a GUI, moving one or more sliding icons of a GUI, voice entries, and the like. In some embodiments, a user may select one or more avatar dimensions 212 of virtual entity 200. Avatar dimensions 200 may include dimensions as described above. In some embodiments, avatar dimensions 212 may include, but are not limited to, heights, widths, lengths, appendages, and the like. In some embodiments, a user may select one or more avatar dimensions 212 through a GUI. In some embodiments, virtual entity 200 may include one or more facial features 208. Facial features 208 may include, but are not limited to, eye spacing, eye size, eye color, eyebrow details, nose size, nose position, mouth size, mouth position, and the like. In some embodiments, facial features 208 may include one or more facial animations. Facial animations may include, but are not limited to, smiling, grinning, smirking, pouting, yelling, laughing, and the like. A user may select one or more facial animations 208 through a GUI, textual entries, and/or voice input. In some embodiments, virtual entity 200 may include apparel, such as, without limitation, shoes, socks, hats, shirts, jackets, bathing suits, helmets, backpacks, watches, glasses, bicycles, roller blades, skis, and the like. A user may select various apparel of virtual entity 200 through a GUI, textual entries, and/or voice input.

Still referring to FIG. 2, in some embodiments, a user may interact with virtual entity 200. Interaction may include, but is not limited to, textual interaction, verbal interaction, physical interaction, and/or other interactions. Interactions may include speaking to virtual entity 200, sending messages to virtual entity 200, and the like. A user may interact with virtual entity 200 through AR, VR, and/or other virtual realities. In some embodiments, interaction may include performing a task with virtual entity 200. A task may include, without limitation, retrieving one or more digital objects, manipulating one or more real world and/or virtual objects, and the like. A user may provide one or more digital objects to virtual entity 200, such as, without limitation, digital foods, apparel, sports equipment, tools, and the like. Virtual entity 200 may provide one or more digital objects to a user through a GUI, VR, AR, and/or other display method. Apparatus 100 may determine user data as a function of user interaction with virtual entity 200. A user may engage in a virtual game of catch with virtual entity 200. Apparatus 100 may determine user data of a user to include an energetic behavioral pattern. Apparatus 100 may modify parameters of virtual avatar model 204 and/or operational model 116 as described above with reference to FIG. 1.

Figure 3:
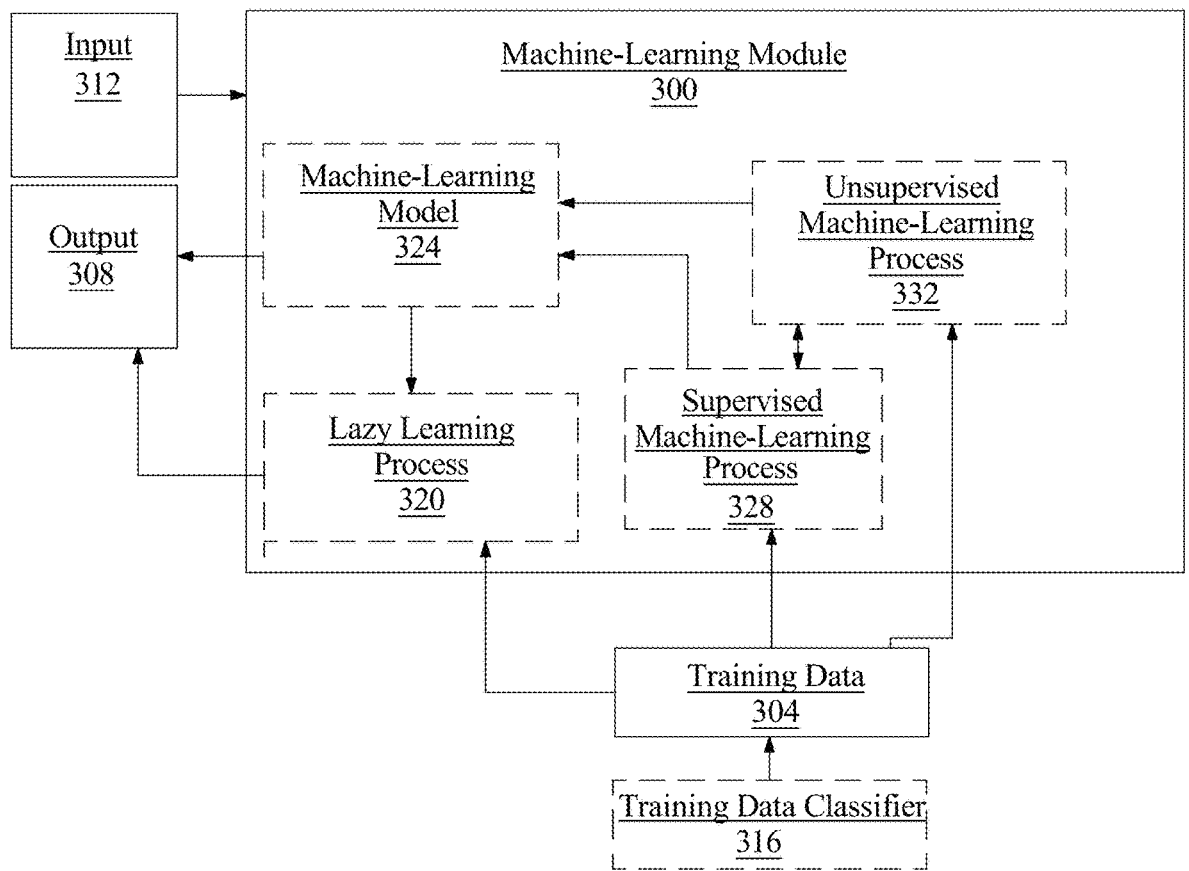
FIG. 3 is an exemplary embodiment of a block diagram of a machine learning model.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, inputs may include user data and outputs may include behavioral parameters.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to behavioral parameters.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include user input as described above as inputs, virtual avatar models as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
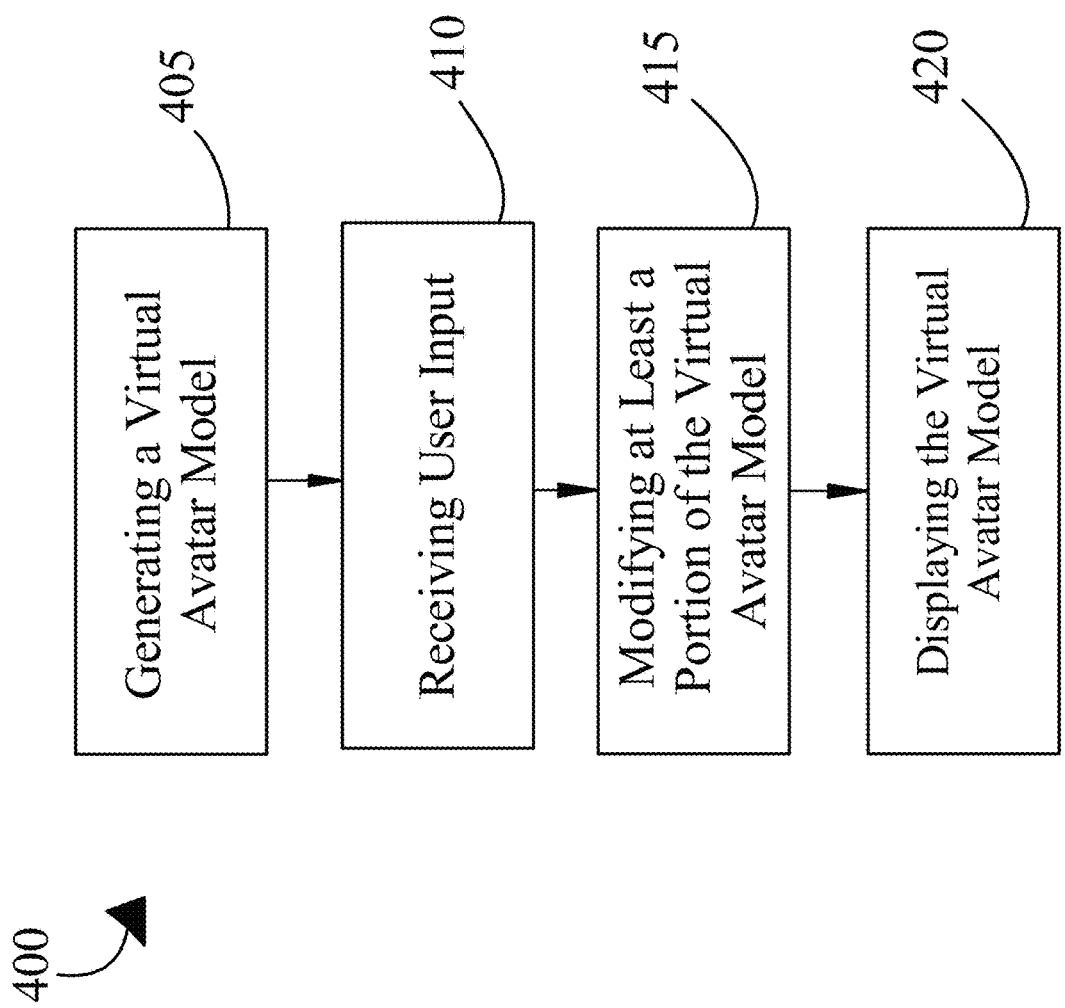
FIG. 4 is a flow diagram depicting a method of generating a virtual avatar.

Referring now to FIG. 4, a flowchart of method 400 of generating a virtual avatar is illustrated. At step 405, method 400 includes generating a virtual avatar model. Generating a virtual avatar model may include generating a virtual avatar model through a machine vision process. This step may be implemented as described above with reference to FIGS. 1-3, without limitation.

Still referring to FIG. 4, at step 410, method 400 includes receiving user input. User input may be received at an apparatus locally, remotely, and/or a combination thereof. This step may be implemented as described above with reference to FIGS. 1-3, without limitation.

Still referring to FIG. 4, at step 415, method 400 includes modifying at least a portion of a virtual avatar model. Modification may include altering a visual, behavioral, and/or other aspect of a virtual entity of a virtual avatar model. This step may be implemented as described above with reference to FIGS. 1-3, without limitation.

Still referring to FIG. 4, at step 420, method 400 includes displaying a virtual avatar model. A virtual avatar model may be displayed in AR, VR, and/or other virtual realities. Displaying a virtual avatar model may include displaying the virtual avatar model through one or more screens, such as, without limitation, smartphones, laptops, monitors, tablets, and the like. This step may be implemented as described above with reference to FIGS. 1-3, without limitation.

With continued reference to FIG. 4, in some embodiments, method 400 may include a step of determining image data from the user data. This step may be implemented as described above with reference to FIGS. 1-3, without limitation. In some embodiments, generating the virtual avatar model comprises generating the virtual avatar model through a machine vision process as a function of the image data. In some embodiments, method 400 may include a step of generating a chatbot, wherein the chatbot is configured to communicate textual data from user input to the at least a processor. This step may be implemented as described above with reference to FIGS. 1-3, without limitation. In some embodiments, modifying the at least a portion of the virtual avatar model of step 415 may be a function of textual data received from the chatbot. In some embodiments, method 400 may include a step of determining behavioral patterns as a function of engagement of the virtual entity with a user. This step may be implemented as described above with reference to FIGS. 1-3, without limitation. In some embodiments, method 400 may include a step of determining objectives of the virtual entity as a function of the user input. This step may be implemented as described above with reference to FIGS. 1-3, without limitation. In some embodiments, method 400 may include a step of determining, by the processor, a behavioral status of a user. This step may be implemented as described above with reference to FIGS. 1-3, without limitation. In some embodiments, modifying the at least a portion of the virtual avatar model of step 415 may be a function of the behavioral status of the user. In some embodiments, method 400 may further include a step of receiving training data correlating user data to virtual avatar model parameters. This step may be implemented as described above with reference to FIGS. 1-3, without limitation. In some embodiments, method 400 may include a step of training a virtual avatar machine learning model with the training data. This step may be implemented as described above with reference to FIGS. 1-3, without limitation. In some embodiments the virtual avatar machine learning model may be configured to input user data and output virtual avatar model parameters. In some embodiments, modifying at least a portion of the virtual avatar model of step 415 may include modifying at least a portion of the virtual avatar model as a function of the virtual avatar machine learning model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
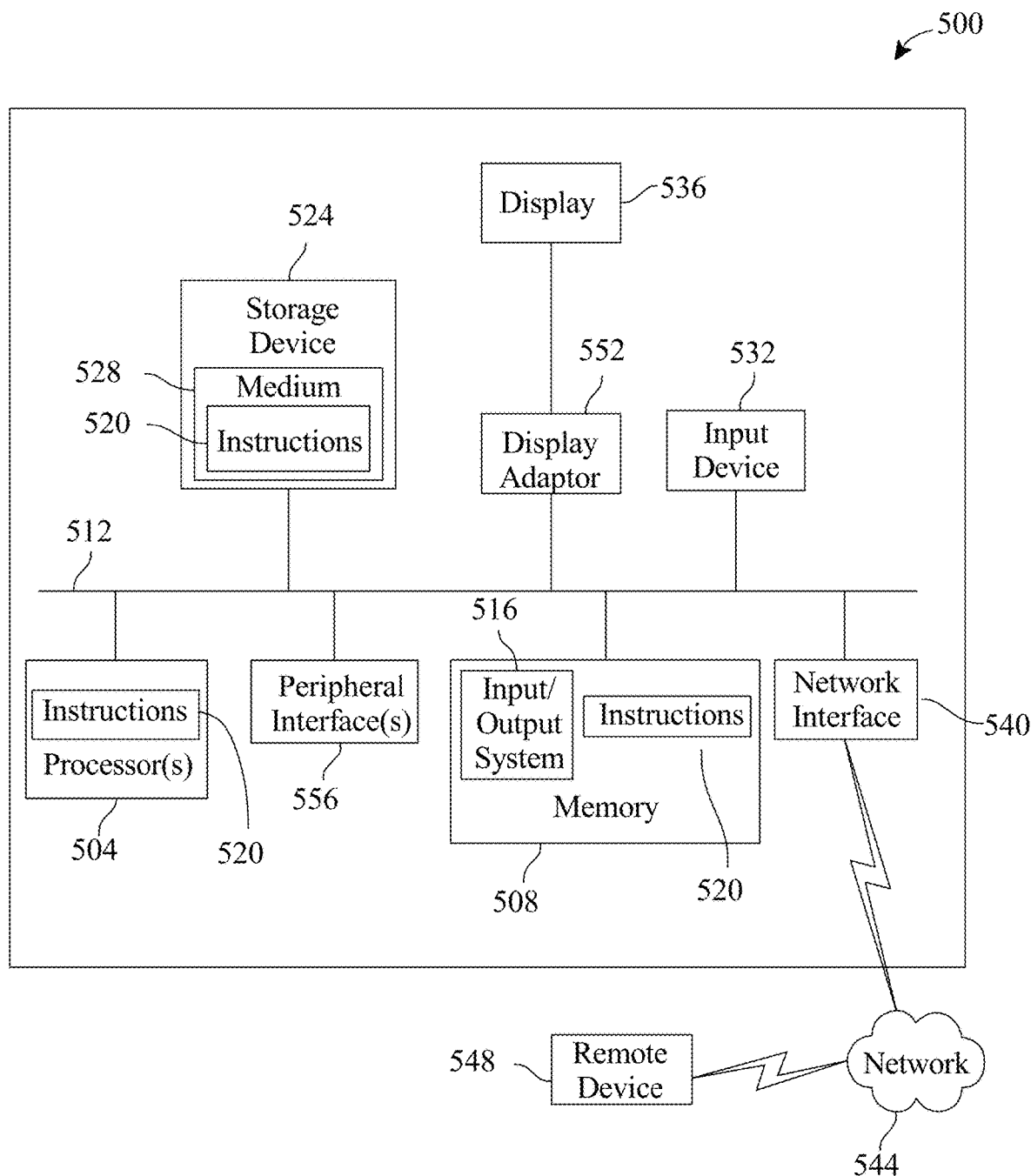
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Still referring to FIG. 5, processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 5, memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Still referring to FIG. 5, computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Still referring to FIG. 5, computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

Still referring to FIG. 5, a user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Still referring to FIG. 5, computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a virtual avatar, comprising:
   at least a processor and a memory communicatively connected to the at least a processor, the memory containing instructions configuring the at least a processor to:
   generate a virtual avatar model, wherein the virtual avatar model comprises:
      a virtual entity comprising a plurality of avatar dimensions, wherein the plurality of avatar dimensions comprises a coordinate system created using a machine vision system; and
      an operational model of the virtual entity, wherein the operational model comprises behavioral parameters corresponding to animations of the virtual entity, wherein a behavioral machine learning model is trained with training data correlating user data to behavioral parameters;
   receive user input, wherein the user input includes an avatar modifier;
   modify at least a portion of the virtual avatar model as a function of the avatar modifier;
   display the virtual avatar model to a user through a display device; and
   receive a verbal interaction from a user, wherein receiving a verbal interaction comprises utilizing an automatic speech recognition process employing a dynamic time warping algorithm to cope with different speaking speeds in audible verbal content and determine a voice input of user data;
   receive a physical interaction from the user, wherein the physical interaction comprises data describing the user performing a task with the virtual entity; and
   modify parameters of the virtual avatar model.

2. The apparatus of claim 1, wherein the memory contains instructions further configuring the at least a processor to:
   determine image data from the user input; and
   generate the virtual avatar model through a machine vision process as a function of the image data.

3. The apparatus of claim 1, wherein the virtual avatar model further comprises avatar apparel.

4. The apparatus of claim 1, wherein the memory contains instructions further configuring the at least a processor to:
   generate a chatbot, wherein the chatbot is configured to communicate textual data from the user input to the at least a processor; and
   modify the at least a portion of the virtual avatar model as a function of the textual data received from the chatbot.

5. The apparatus of claim 1, wherein the memory contains instructions further configuring the at least a processor to determine behavioral patterns as a function of engagement of the virtual entity with a user.

6. The apparatus of claim 1, wherein the memory contains instructions for further configuring the at least a processor to determine objectives of the virtual entity as a function of the user input.

7. The apparatus of claim 1, wherein displaying the virtual avatar model includes displaying the virtual avatar model in augmented reality.

8. The apparatus of claim 1, wherein the memory contains instructions further configuring the at least a processor to determine a behavioral status of a user and modify the virtual avatar model as a function of the behavioral status of the user.

9. The apparatus of claim 1, wherein the memory contains instructions further configuring the at least a processor to:
receive training data correlating user data to virtual avatar model parameters;
train a virtual avatar machine learning model with the training data, wherein the virtual avatar machine learning model is configured to input user data and output virtual avatar model parameters; and
modify the at least a portion of the virtual avatar model as a function of the virtual avatar machine learning model.

10. A method of generating a virtual avatar, comprising:
generating, by a processor, a virtual avatar model, wherein the virtual avatar model comprises:
a virtual entity comprising a plurality of avatar dimensions, wherein the plurality of avatar dimensions comprises a coordinate system created using a machine vision system; and
an operational model of the virtual entity, wherein the operational model comprises behavioral parameters corresponding to animations of the virtual entity, wherein a behavioral machine learning model is trained with training data correlating user data to behavioral parameters;
receiving, by the processor, user input, wherein the user input includes an avatar modifier;
modifying, by the processor, at least a portion of the virtual avatar model as a function of the user input;
displaying, using the processor, the virtual avatar model to a user through a display device;
receiving, by the processor, a verbal interaction from a user, wherein receiving a verbal interaction comprises utilizing an automatic speech recognition process employing a dynamic time warping algorithm to cope with different speaking speeds in audible verbal content and determine a voice input of user data;
receiving, by the processor, a physical interaction from the user, wherein the physical interaction comprises data describing the user performing a task with the virtual entity; and
modifying, by the processor, parameters of the virtual avatar model.

11. The method of claim 10, further comprising determining, by the processor, image data from the user data, wherein generating the virtual avatar model comprises generating the virtual avatar model through a machine vision process as a function of the image data.

12. The apparatus of claim 1, wherein the task comprises manipulating at least a virtual object.

13. The method of claim 10, wherein the virtual avatar model further comprises avatar apparel.

14. The method of claim 10, further comprising generating, by the processor, a chatbot, wherein the chatbot is configured to communicate textual data from user input to the at least a processor, wherein modifying the at least a portion of the virtual avatar model is a function of textual data received from the chatbot.

15. The method of claim 10, wherein further comprising determining, by the processor, behavioral patterns as a function of engagement of the virtual entity with a user.

16. The method of claim 10, further comprising determining, by the processor, objectives of the virtual entity as a function of the user input.

17. The method of claim 10, wherein displaying the virtual avatar model comprises displaying the virtual avatar model in augmented reality.

18. The method of claim 10, further comprising determining, by the processor, a behavioral status of a user, wherein modifying the at least a portion of the virtual avatar model is a function of the behavioral status of the user.

19. The method of claim 10, further comprising:
receiving, by the processor, training data correlating user data to virtual avatar model parameters;
training, by the processor, a virtual avatar machine learning model with the training data, wherein the virtual avatar machine learning model is configured to input user data and output virtual avatar model parameters; and
wherein modifying at least a portion of the virtual avatar model comprises modifying at least a portion of the virtual avatar model as a function of the virtual avatar machine learning model.

20. The method of claim 10, wherein the task comprises manipulating at least a virtual object.

* * * * *